June 9, 1936. T. W. MILLER 2,043,327
HEAT EXCHANGING CONTAINER
Filed July 9, 1934
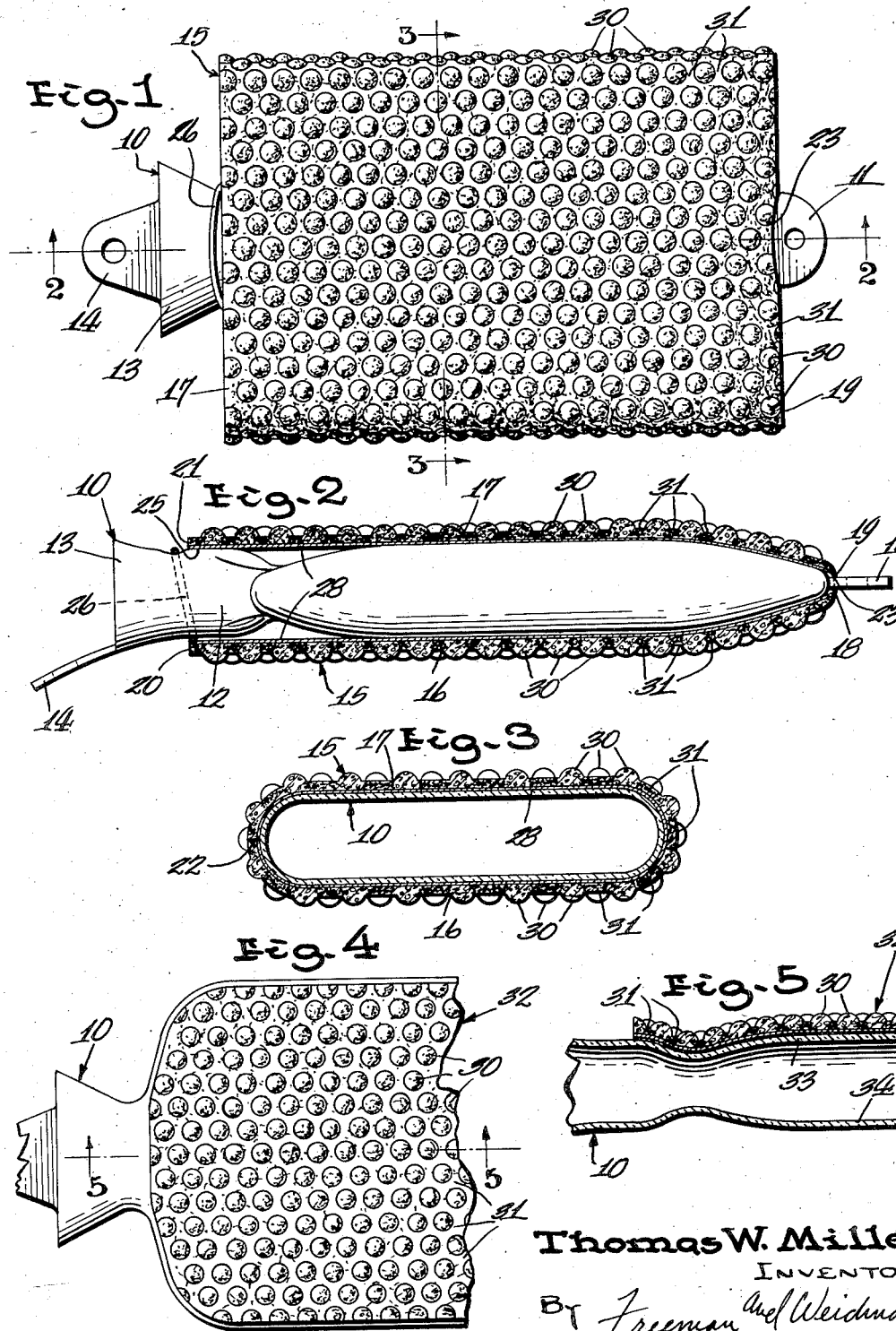
Thomas W. Miller
INVENTOR
By Freeman and Weidman
ATTORNEYS Patented June 9, 1936

2,043,327

UNITED STATES PATENT OFFICE 2,043,327

HEAT EXCHANGING CONTAINER

Thomas W. Miller, Ashland, Ohio, assignor to The Faultless Rubber Company, Ashland, Ohio, a corporation of Ohio Application July 9, 1934, Serial No. 734,433

9 Claims. (Cl. 150—52)

This invention relates to heat exchanging containers, and an object of the invention is to provide new and improved containers of this character.

In the drawing accompanying this specification, and forming part of this application, I have shown, for purposes of illustration, certain forms which my invention may assume, and in the drawing:

Figure 1 is a plan view of one embodiment of the invention,

Figure 2 is an enlarged sectional view corresponding substantially to the line 2—2 of Figure 1, Figure 3 is an enlarged sectional view corresponding substantially to the line 3—3 of Figure 1, Figure 4 is a fragmentary plan view of another embodiment of the invention, while Figure 5 is an enlarged fragmentary sectional view, corresponding substantially to the line 5—5 of Figure 4.

The bottle unit shown in Figures 1 through 3 comprises a hot water bottle 10 having a first apertured tab 11 at its closed end, a reduced neck 12, a flared mouth 13, and a second apertured tab 14 adjacent the flared mouth 13.

Surrounding the bottle 10 is a cover 15 comprising a single piece of rubber sponge having oppositely disposed side walls 16 and 17, bottom edges 18 and 19, and top edges 20 and 21; the meeting edges of the side walls 16 and 17, indicated at 22, are secured together throughout their lengths by rubber cement or the like, and the bottom edges 18 and 19 are similarly secured except for a central section left open to provide an aperture 23 for the tab 11 of the bottle 10.

The top edges 20 and 21 are not secured together, but remain open, to form an open mouth 25 extending transversely of the top of the cover 15 and through which the bottle 10 is inserted.

The cover 15 and the bottle 10 are detachably secured to each other by means of a rubber band 26 mounted on the inner surface of the side wall 16, and the band 26 is formed to be stretched over the flared mouth 13 and into engagement with the neck 12 of the hot water bottle 10, to hold the cover 15 and the bottle 10 in position with respect to each other.

The walls 16 and 17 are of rubber sponge, and are reinforced along their inner surfaces by a skin or rind 28, left thereon as a result of molding the rubber sponge.

The outer surfaces of the walls 16 and 17 are provided with uniformly spaced raised places 30 separated by recessed areas 31, and the shaped exterior surface of the walls 16 and 17 are in cut-section, to expose the cellular formation of the rubber sponge.

The rubber sponge from which the cover 15 is formed may be fabricated by forming a slab of partially vulcanized rubber sponge, and splitting the slab, to secure a partially-vulcanized sheet having one face in cut-section to expose the cellular formation of the rubber sponge, and having the outer face provided with the skin or rind resulting from the preliminary vulcanization.

This sheet of rubber sponge is then placed in a mold, the sides of which are constituted by a rectangular frame, but the faces of which are configured to shape the faces of the sheet in the desired design. In this instance the mold face intended to contact the cut-section surface of the sheet, is configured similarly to the shaped outer surface of the cover 15, and the other mold face, intended to contact the skin surface of the sheet, is provided with a plane surface similar to the inner surface of the cover 15.

Thereupon the mold, containing the sheet of partially-vulcanized rubber sponge, is placed between press platens, and the platens are advanced until the mold plates selectively compress the sheet, according to the configuration of the mold plates.

I maintain this condition until the heat from the platens has completed the vulcanization of the rubber, and the sheet has been set, with its cellular structure and bulk selectively changed and re-formed, to provide the sheet from which the cover 15 is cut.

Under these circumstances it will be understood that in the cover 15 the rubber sponge differs in cellular density, being of lesser cellular density at the raised places 30, and of greater cellular density at the recessed portions 31 separating the raised places 30, and concurrently, differs likewise in resistance to heat transfer, the resistance to transfer of heat being generally reversely proportional to the cellular density, that is, less at the recesses 31 and greater at the raised places 30, so that the areas and distribution of the raised places 30 being properly selected, heat will be transmitted through the cover 15, but in controlled and proper amount, to prevent overheating or burning of the patient to whom the bottle unit is applied.

It also will be appreciated that the exposed cut-section embossed surface of the cover 15 provides on the bottle unit an exterior surface that is pleasant to the touch and to the eye, and also that tends to cling, to hold the bottle unit in position.

It will be understood that the cover 15 may be integral with the bottle 10, either by being formed integral with the bottle or by being integrated with the bottle after the bottle and cover have been formed separately, as for example, by being cemented to the bottle, and in Figures 4 and 5 I have shown a cover 32 integral with the bottle 10, but in this embodiment of the invention I have shown the cover 32 overlying only the one face 33 of the bottle 10, and not the other face 34, and by this construction I secure a further advantage, that after the difference in temperature has decreased the bottle may be turned, and the reverse side applied.

That is, initially, when the difference in temperature is greater, the bottle is applied on the side 33 carrying the cover 32, and then later is reversed, and applied on the other side 34, when the difference in temperature has decreased, and the necessity for insulation and control of the transfer of heat has disappeared.

It will be understood to those skilled in the art that the bottle units herein described accomplish at least the principal object of my invention, and concurrently, it also will be apparent that my invention has uses and advantages other than those herein specifically mentioned; furthermore, it also will be appreciated that various changes and modifications may be made, without departing from the spirit of the invention; and accordingly, that the embodiments herein disclosed are illustrative only, and that the invention is not limited thereto.

I claim:

1. A heat-exchanging container, comprising a container portion, and including a heat-transfer-retarding portion overlying at least a part of said container portion and comprising rubber sponge having different cellular densities at different portions thereof, to provide for greater resistance to transfer of heat through one of said portions than through another of said portions.

2. A heat-exchanging container, comprising a container portion, and including a heat-transfer-retarding portion overlying at least part of said container portion and comprising rubber sponge having its outer surface embossed, to provide for transfer of heat through said rubber sponge, the recessed portions of said rubber sponge being of greater cellular density than the raised portions thereof.

3. A heat-exchanging container, comprising a container portion, and including a heat-transfer-retarding portion overlying at least a part of said container portion and comprising rubber sponge having different cellular densities at different portions thereof, to provide for greater resistance to transfer of heat through one of said portions than through another of said portions, and having its outer surface exposed and in cut-section, to provide an operative surface adapted to cling, to facilitate retention of said container in position.

4. A heat-exchanging container, comprising a container portion, and including a heat-transfer-retarding portion overlying at least a part of said container portion and comprising rubber sponge having its outer surface embossed, to provide for transfer of heat, the recessed portions of said sponge being of greater cellular density than the raised portions thereof, and the outer surface of said sponge being in cut-section, to provide on said container an operative surface adapted to cling, to facilitate retention of said container in position.

5. A heat-transfer-retarding cover, comprising rubber sponge having different cellular densities at different portions thereof, to provide greater resistance to transfer of heat at one portion than at another.

6. A heat exchanging container having a heat-transfer-retarding portion comprising a continuous layer of sponge rubber, embossed along its outer surface, and forming outwardly opening recessed areas providing for the transfer of heat, the bottoms of said recesses being defined by the sponge rubber of said continuous layer.

7. A heat exchanging container, comprising a container portion, and including a heat-transfer-retarding portion, overlying at least a part of said container portion, and comprising a continuous layer of sponge rubber, embossed along its outer surface and forming outwardly opening recessed areas providing for the transfer of heat, the bottoms of said recesses being defined by the sponge rubber of the continuous layer.

8. A heat exchanging container comprising a continuous layer of sponge rubber, embossed along its outer surface and forming outwardly opening recessed areas providing for the transfer of heat, the bottoms of said recesses being defined by the sponge rubber of said continuous layer, and the entire outer surface of said layer, including the protuberances of said embossments, being in cut section.

9. A heat-exchanging container, comprising a container portion, and including a heat-transfer-retarding portion overlying at least a part of said container portion and comprising rubber sponge having an exposed embossed surface forming recesses providing for transfer of heat therethrough, and having said embossed surfaces, including the protuberances of said embossments, in cut section.

THOMAS W. MILLER.